| United States Patent [19]
Sublett et al. | [11] 3,948,859
[45] Apr. 6, 1976 |

[54] COPOLYESTER HOT-MELT ADHESIVES

[75] Inventors: Bobby J. Sublett; Willis C. Wooten, Jr., both of Kingsport, Tenn.

[73] Assignee: Eastman Kodak Company, Rochester, N.Y.

[22] Filed: July 9, 1975

[21] Appl. No.: 594,847

Related U.S. Application Data

[63] Continuation-in-part of Ser. No. 476,980, June 6, 1974, abandoned.

[52] U.S. Cl. .............................. 260/75 R; 156/332
[51] Int. Cl.² ......................................... C08G 63/18
[58] Field of Search ................. 260/75 R; 156/332

[56] References Cited
UNITED STATES PATENTS

| 3,502,620 | 3/1970  | Caldwell ........................... 260/75 R   |
| 3,668,277 | 6/1972  | Riemhofer, et al. ........... 260/75 R X |
| 3,669,921 | 6/1972  | Droke et al. .................... 260/75 R X |
| 3,682,863 | 8/1972  | McHale ............................. 260/75 R   |
| 3,699,187 | 10/1972 | Gardziella ........................ 156/332     |

OTHER PUBLICATIONS

Chen, et al., Def. Pub. of Serial No. 402,246, filed 10/1/73, Def. Pub. No. T925,005.

*Primary Examiner*—Lewis T. Jacobs
*Assistant Examiner*—W. C. Danison, Jr.
*Attorney, Agent, or Firm*—Elliott Stern; Daniel B. Reece, III

[57] ABSTRACT

Copolyesters useful as melt adhesives in the bonding of fabrics, and other products derived from (1) terephthalic acid, (2) adipic acid, (3) ethylene glycol, and (4) 1,6-hexanediol or derivatives of these components.

2 Claims, No Drawings

COPOLYESTER HOT-MELT ADHESIVES

This is a continuation-in-part application corresponding to U.S. application Ser. No. 476,980 filed June 6, 1974, now abandoned.

This invention relates to copolyesters useful as hot-melt adhesives. More specifically this invention relates to copolyester melt adhesives derived from (1) terephthalic acid or ester forming derivatives thereof, (2) adipic acid or ester forming derivatives thereof, (3) ethylene glycol, and (4) 1,6-hexanediol.

While copolyester melt adhesives have been known to be well suited for bonding of fabrics (see for example U.S. Pat. No. 3,669,921), certain applications for the bonding of fabrics have restrictive specifications. For example, the bonding of innerlinings to coats, suits and overcoats require a finely-divided powdered adhesive which can be bonded using a commercial steam press, e.g., bonding temperature below 112°C. Besides being a powder bondable at less than 112°C., the adhesive must have all further attributes of a good fabric adhesive, e.g., (1) bonding without primer, (2) rapid attainment of bond strength after the adhesive is applied and the coated surfaces pressed together, (3) acceptable peel strength, (4) flexibility without embrittlement or loss of adhesion on aging, (5) retention of bond strength and flexibility over a wide range of temperature, e.g., −20°C. to about 60°C., and (6) resistance to the action of dry cleaning solvents. The compositions of this invention to a great extent meet these requirements.

According to one aspect of this invention, there is provided a hot-melt adhesive composition comprising a copolyester derived from Components (1), (2), (3) and (4) as follows:

1. from about 75 to 95 mole percent terephthalic acid or ester forming derivatives thereof;
2. from about 5 to 25 mole percent adipic acid or ester forming derivatives thereof;
3. from about 55 to 85 mole percent 1,6-hexanediol; and
4. from about 15 to 45 mole percent ethylene glycol, said copolyester having a softening point within the range of about 70° to 120°C. and an inherent viscosity (I.V.) of at least about 0.50 as measured at 25°C. using 0.50 gram of copolyester per 100 ml. of a solvent consisting of 60 percent by weight phenol and 40 percent by weight tetrachloroethane.

In a preferred embodiment of the invention there is provided a hot-melt adhesive composition comprising the copolyester defined above, except that the mole ratio terephthalic acid to adipic acid is about 85:15 to about 95:5 and the mole ratio of ethylene glycol to 1,6-hexanediol is about 70:30 to about 80:20. These low-melting (i.e., below 112°C.) adhesives exhibit good bond strength, flexibility, retention of strength on aging and retention of bond strength over a wide temperature range. These copolyesters are surprisingly nontacky and nonblocking, which is an especially advantageous characteristic for a copolyester having such low melting characteristics. The copolyesters of this invention may be prepared by standard procedures well known to those skilled in the art. See, for example, British Pat. No. 1,047,072. In a preferred embodiment of this invention the copolyesters will have an inherent viscosity of at least about 0.8 and a melting point within the range of 90°–110°C.

The hot-melt fabric adhesives of this invention are copolyesters derived from the reaction of two glycols and two dicarboxylic acids. In this invention the glycols are a mixture of ethylene glycol and 1,6-hexanediol (equal to a total of 100 mole percent glycol) and the dicarboxylic acids are a mixture of terephthalic acid and adipic acid (equal to a total of 100 mole percent of dicarboxylic acid) in specific proportions.

While reference to terephthalic acid has been made, ester forming derivatives of such acids can be employed, if desired, to prepare the copolyesters of this invention. Examples of such ester forming derivatives are the acids, anhydrides, esters and ester chlorides of such acids. For example, dimethyl terephthalate may be employed in place of terephthalic acid; dimethyl adipate can be used in place of adipic acid. Another method is to prepare a diester of the adipic acid and the 1,6-hexanediol and then mix the diesters with polyethylene terephthalate. This mixture may then be melted and polymerized at about 240° to 280°C. under reduced pressure until the inherent viscosity of the polymer product is at least 0.50.

In accordance with this invention, polymerization is carried out under such conditions that the resulting copolyester will have a range of mole ratios of terephthalic acid to adipic acid from 80:20 to about 95:5, a range of mole ratios of ethylene glycol to 1,6-hexanediol from 60:50 to about 15:85 and an I.V. greater than about 0.5.

If desired, dyes or dye receptive agents, color stabilizers and various other adjuvants may be added to the copolyester adhesives of our invention to meet certain specific end use requirements. Such additives would normally be added as such to the polymerization mixture in which the copolyester is produced.

As indicated above, when a copolyester prepared as described above is applied as melt adhesives to various fabric systems, excellent bonds result. These bonds are found to be highly resistant to the action of dry cleaning solvents such as perchloroethylene.

Although the procedure employed for the lamination or bonding of fabrics and other substrates and the methods of testing bond strengths are, in general well known to those skilled in the art, the following examples are included for a better understanding of the invention.

EXAMPLES 1–3

The copolyesters employed in this example are prepared by the general process of mixing 1,6-hexanediol and ethylene glycol with a specific combination of dimethyl terephthalate and dimethyl adipate. The amount of diol is 20–50% molar excess over that required by stoichiometry to combine with the acid-functioning components. A catalytic amount of a metallic catalyst, e.g., titanium isopropoxide, is added and the entire mixture stirred and heated to a temperature of about 200°–220°C. for 3 hours. Methanol is removed from the mixture by distillation. The pressure in the reaction vessel is lowered to about 0.1 mm. Hg and the temperature raised to about 265°C. The product is stirred at this temperature and at this reduced pressure from about 1 hour and then cooled. The proportions of acid and glycol components of the copolyester in the final product are shown in the attached table.

The copolyester adhesives, prepared as described above, are employed to laminate poly(ethylene terephthalate)/cotton fabric (70%/30%) in the form of sample strips 1 × 6 inches in size. The lamination is prepared at one end of the strips, covering an area of 1 square inch of the substrate. The adhesive powder <70 mesh is sprinkled over the 1 inch square area, and the laminate is made by placing the two fabric strips containing the powdered adhesive in a commercial steam iron and pressing the strips together for approximately 10 seconds. The bonding is tested by determining the peel strength on an Instron Tensile Tester.

Examples of adhesives that are useful as lower-melting adhesives are shown in the examples in the table. Examples 1, 2, 4 and 6 are excellent low-melting, non-blocking, dry cleaning resistant powder adhesives for fabrics. Example 3 is an adhesive prepared from the same monomers but contains acid comonomer concentrations outside the range of those of the effective compositions. The composition in Example 3 is a low-melting copolyester, but has a very low degree of crystallinity, is tacky and has poor cohesive strength and is not dry cleaning resistant. Example 5 is an adhesive prepared from the same monomers but contains glycol comonomer concentrations outside the range of those of effective compositions. The composition of Example 5 is a low-melting copolyester, but has poor grindability and lost about 23% of T-peel strength on dry cleaning. Example 7 is an adhesive disclosed in U.S. Pat. No. 3,669,921 and is prepared from the same monomers of this invention except the 1,6-hexanediol is replaced with 1,4-butanediol. This composition is too high melting and is not bondable at less than 112° C. and is therefore unacceptable.

The invention has been described in detail with particular reference to preferred embodiments thereof, but it will be understood that variations and modifications can be effected within the spirit and scope of the invention.

We claim:
1. A hot melt adhesive composition comprising a copolyester derived from Components (1), (2), (3) and (4) as follows:
   1. from about 75 to 95 mole percent terephthalic acid or ester forming derivatives thereof;
   2. from about 5 to 25 mole percent adipic acid or ester forming derivatives thereof;
   3. from about 55 to 85 mole percent 1,6-hexanediol; and
   4. from about 15 to 45 mole percent ethylene glycol, said copolyester having a softening point within the range of about 70° to 120°C. and an inherent viscosity of at least about 0.50 as measured at 25°C. using 0.50 gram of copolyester per 100 ml. of a solvent consisting of 60 percent by weight phenol and 40 percent by weight tetrachloroethane.

2. The composition of claim 1 wherein the mole percents of Components (1), (2), (3) and (4) are as follows:
   1. 85 to 95 mole percent;
   2. 5 to 15 mole percent;
   3. 70 to 80 mole percent; and
   4. 20 to 30 mole percent,
said copolyester having a softening point within the range of about 90° to 110°C. and an inherent viscosity of at least about 0.8.

* * * * *

Table

| Example Number | Properties of Copolyester Adhesives | | |
|---|---|---|---|
| | 1 | 2 | 3 |
| Molar proportions of acid and glycol components in polyester | 90 terephthalic acid<br>10 adipic acid<br>24 ethylene glycol<br>76 1,6-hexanediol | 85 terephthalic acid<br>15 adipic acid<br>40 ethylene glycol<br>60 1,6-hexanediol | 70 terephthalic acid<br>30 adipic acid<br>40 ethylene glycol<br>60 1,6-hexanediol |
| Inherent viscosity | 0.93 | 0.91 | 0.88 |
| T-Peel strength at 23°C. lb./in. | 24.7 | 23 | 7 |
| T-Peel strength after dry cleaning 20 cycles lb./in. | 21.7 | 19 | 2 |
| *Melting point (TMA) | 102 | 96 | 79 |
| Bonding temperature, °C. | steam iron approximately 112°C. | steam iron approximately 112°C. | steam iron approximately 112°C. |
| Type failure | none | none | T-peel poor, Dry cleaning poor |
| Grindability | excellent | excellent | poor |

| Example No. | 4 | 5 | 6 | 7 |
|---|---|---|---|---|
| Molar proportions of acid and glycol components in polyester | 80 terephthalic acid<br>20 adipic acid<br>40 ethylene glycol<br>60 1,6-hexanediol | 80 terephthalic acid<br>20 adipic acid<br>50 ethylene glycol<br>50 1,6-hexanediol | 75 terephthalic acid<br>25 adipic acid<br>40 ethylene glycol<br>60 1,6-hexanediol | 80 terephthalic acid<br>20 adipic acid<br>40 ethylene glycol<br>60 1,4-butanediol |
| Inherent viscosity | 0.92 | 0.88 | 0.81 | 0.92 |
| T-Peel at 23°C. lb./in./width | 35.2 | 30.2 | 19.8 | 20.4 |
| T-Peel strength after dry cleaning 20 cycles lb./in./width | 29.07 | 23.16 | 17.8 | 19.38 |
| *Melting point (TMA) | 93 | 87 | 84 | 154 |
| Bonding Temp. °C. | steam iron approximately 112°C. | steam iron approximately 112°C. | steam iron approximately 112°C. | Hot press 160°C. Would not bond at 112°C. |
| Type Failure | None | Grindability poor 23% Loss T-peel on dry cleaning | | |
| Grindability | Excellent | Poor | Excellent | Excellent |

*TMA is thermomechanical analysis.